(12) United States Patent
Thimmanna Bhattar et al.

(10) Patent No.: US 12,447,983 B2
(45) Date of Patent: Oct. 21, 2025

(54) METHOD, SYSTEM AND VEHICLE FOR IMPROVING DRIVING EFFICIENCY

(71) Applicant: VOLVO TRUCK CORPORATION, Gothenburg (SE)

(72) Inventors: Santhosh Kumar Thimmanna Bhattar, Karnataka (IN); Parveez Khuzama, Karnataka (IN); Divyashree Y, Karnataka (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 204 days.

(21) Appl. No.: 18/312,225

(22) Filed: May 4, 2023

(65) Prior Publication Data

US 2023/0356732 A1     Nov. 9, 2023

(30) Foreign Application Priority Data

May 9, 2022  (EP) .................................. 22172408

(51) Int. Cl.
*B60W 50/04*   (2006.01)
*B60K 35/10*   (2024.01)
(Continued)

(52) U.S. Cl.
CPC .......... *B60W 50/045* (2013.01); *B60K 35/10* (2024.01); *B60K 35/22* (2024.01); *B60K 35/28* (2024.01);
(Continued)

(58) Field of Classification Search
CPC ............. B60W 50/045; B60W 50/085; B60W 60/001; B60W 2556/45; B60W 50/14;
(Continued)

(56) References Cited

U.S. PATENT DOCUMENTS 10,521,983 B1 * 12/2019 Hsu-Hoffman ........ G07C 5/008
11,501,384 B2 * 11/2022 Kraft ................... G07C 5/0816
(Continued)

FOREIGN PATENT DOCUMENTS

EP     1973078 A1     9/2008

OTHER PUBLICATIONS

Extended European Search Report in corresponding European Application No. 22172408.1 dated Oct. 21, 2022 (7 pages).
(Continued)

*Primary Examiner* — Richard M Camby
(74) *Attorney, Agent, or Firm* — Venable LLP; Jeffri A. Kaminski

(57) ABSTRACT

A vehicle, system and method for improving driving efficiency for a first host vehicle with at least one propulsion unit and at least one energy storage unit are provided. The method comprises; determining a first set of parameters which affects driving efficiency before a driving session with the first host vehicle is initiated and providing input indicative thereof to a user interface or an autonomous or semi-autonomous driving system of the first host vehicle, monitoring a second set of parameters which affects driving efficiency during the driving session of the first host vehicle, comparing parameters of the first and second set of parameters with corresponding parameters received from at least one second host vehicle, and in response to identified differences between parameters of the first and second host vehicle, and providing input indicative thereof to the user interface or the autonomous or semi-autonomous driving system of the first host vehicle.

11 Claims, 3 Drawing Sheets

(51) Int. Cl.
*B60K 35/22* (2024.01)
*B60K 35/28* (2024.01)
*B60K 35/29* (2024.01)
*B60K 35/85* (2024.01)
*B60W 50/08* (2020.01)
*B60W 60/00* (2020.01)

(52) U.S. Cl.
CPC .............. *B60K 35/29* (2024.01); *B60K 35/85* (2024.01); *B60W 50/085* (2013.01); *B60W 60/001* (2020.02); *B60W 2556/45* (2020.02)

(58) Field of Classification Search
CPC . B60W 2050/0063; B60W 2050/0066; B60W 2050/146; B60W 2510/0638; B60W 2510/0642; B60W 2510/0647; B60W 2510/244; B60W 2510/305; B60W 2520/10; B60W 2520/105; B60W 2530/10; B60W 2530/20; B60W 2530/209; B60W 2540/10; B60W 2540/12; B60W 2556/10; B60W 2556/50; B60W 2556/65; B60K 35/10; B60K 35/22; B60K 35/29; B60K 35/85; B60K 2360/167; B60K 2360/169; B60K 2360/174; B60K 2360/1868; B60K 35/28
See application file for complete search history.

(56) References Cited

U.S. PATENT DOCUMENTS

| | | | |
|---|---|---|---|
| 11,593,688 B1* | 2/2023 | Fields | B60W 40/09 |
| 11,951,833 B1* | 4/2024 | Wu | G06V 20/46 |
| 11,994,400 B2* | 5/2024 | Li | G06Q 10/047 |
| 2014/0277874 A1 | 9/2014 | Crombez et al. | |
| 2014/0340211 A1 | 11/2014 | Hennessey et al. | |
| 2016/0253924 A1* | 9/2016 | Kwak | G07C 5/02 701/123 |
| 2017/0061825 A1* | 3/2017 | Payne | G09B 19/167 |
| 2017/0305434 A1* | 10/2017 | Ratnasingam | G05D 1/0088 |
| 2019/0011273 A1 | 1/2019 | Powell et al. | |
| 2019/0265057 A1 | 8/2019 | Baglino et al. | |
| 2021/0241379 A1* | 8/2021 | Kraft | G06Q 40/08 |

OTHER PUBLICATIONS

European Communication pursuant to Article 94(3) EPC dated Jun. 4, 2025 in corresponding European Patent Application No. 22172408. 1, 4 pages.

* cited by examiner

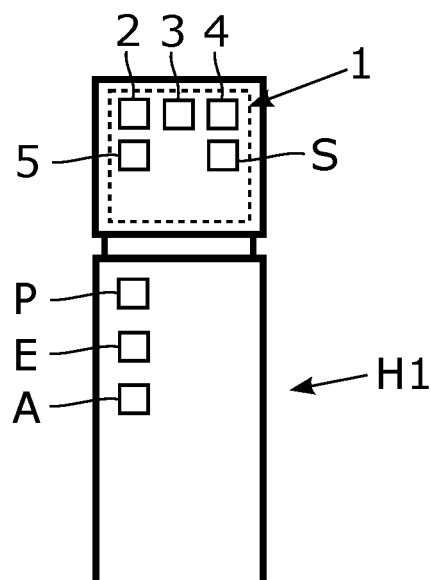
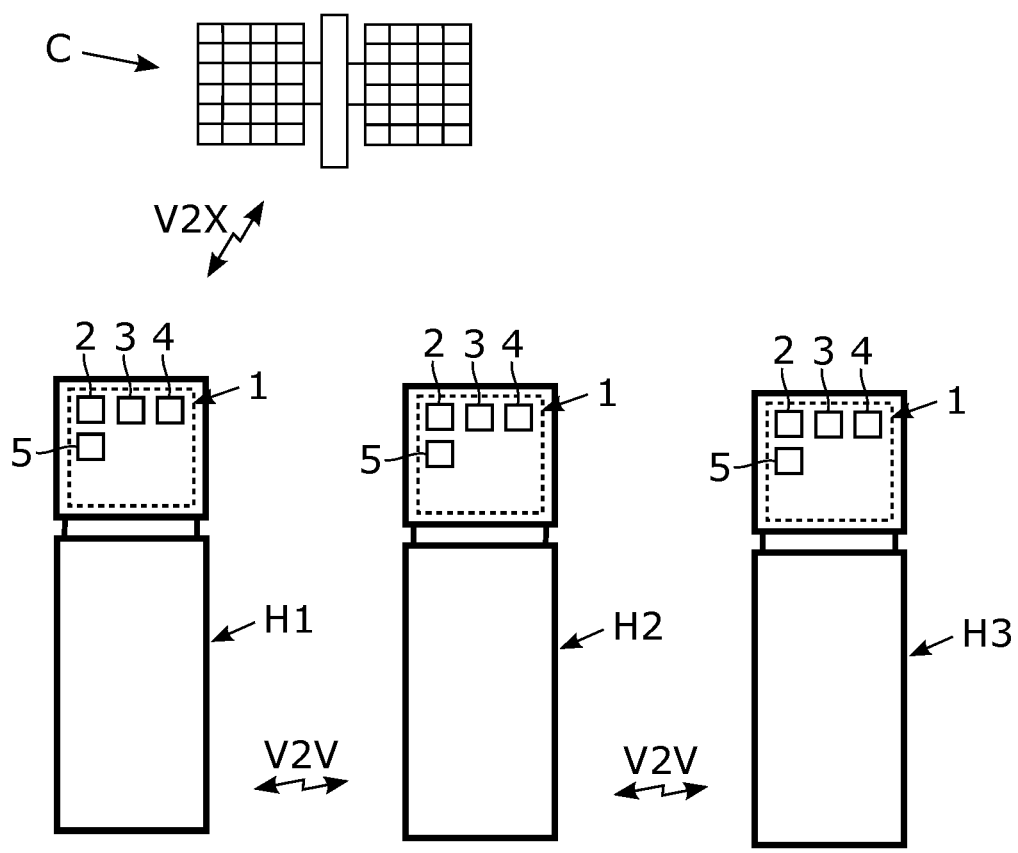
Fig. 2
Fig. 3

METHOD, SYSTEM AND VEHICLE FOR IMPROVING DRIVING EFFICIENCY

TECHNICAL FIELD

Embodiments herein relate to a method for improving driving efficiency of a host vehicle. Embodiments herein further relate to a system for improving driving efficiency of a host vehicle and a vehicle comprising such system.

BACKGROUND

Many different factors and parameters may affect driving efficiency, or in other words, how driving of a vehicle and/or transportation of goods with the vehicle can be made as efficient as possible. Driving efficiency may relate e.g. to consumption of fuel and/or electricity needed for propulsion of the vehicle, decreasing transportation time, making good use of the vehicle operator's driving- and rest-time or similar factors.

The amount of energy, such as diesel/gas/LNG/electricity needed for a particular route or distance to be driven may depend on a number of factors. The total weight and the payload of the vehicle affects the energy consumption. Different engines and/or electric motors require different amounts of energy, i.e. an engine with a lower fuel consumption requires less diesel for travelling a particular distance than a vehicle with a less efficient engine. One electric motor and associated drive train may produce less heat/friction/losses than another electric motor, and may be able to propel a truck into which it is mounted with a higher level of efficiency. The energy needed for a particular trip may thus be smaller, or the vehicle may require charging less frequently.

In additional to factors related to the vehicle or drivetrain itself, different vehicle operators may have different skills in driving the vehicle. If a driver is able to reduce the amount of accelerations and decelerations during a journey, energy consumption may be decreased. Fuel consumption may be reduced during platooning, i.e. when trucks are driving relatively close to each other in a convoy, since air resistance is decreased.

During the last decades a lot of improvements related to driving efficiency and reduced energy consumption have been made. However, improvements in the field of driving efficiency with regards to some or all of the aspects discussed herein are still desirable.

SUMMARY

Embodiments herein aim to provide a method for improving driving efficiency, eliminating or at least reducing the problems and/or drawbacks associated with prior art solutions.

According to an embodiment, this is provided by a method for improving driving efficiency for a host vehicle with at least one propulsion unit and at least one energy storage unit, wherein the method comprises;
  determining a first set of parameters which affects driving efficiency before a driving session with the first host vehicle is initiated and providing input indicative of the first set of parameters to a user interface or an autonomous or semi-autonomous driving system of the host vehicle,
  monitoring a second set of parameters which affects driving efficiency during the driving session of the first host vehicle,
  comparing parameters of the first and second set of parameters with corresponding parameters received from at least one second host vehicle, and in response to identified differences between parameters of the first and second host vehicle,
  providing input indicative thereof to the user interface or an autonomous or semi-autonomous driving system of the host vehicle.

Since parameters for the first and second set of parameters are compared with corresponding parameters received from at least one second host vehicle, input on the differences can be provided to the user interface such that the first vehicle driver is made aware of and enabled to use this information during driving. Alternatively, or in combination, information on the parameters and any differences therebetween resulting from the comparison between the first host vehicle and second host vehicle are provided as input to an autonomous or semi-autonomous driving system of the host vehicle.

Accordingly, the driver of the host vehicle or a (semi) autonomous driving system of the host vehicle may select or use values/parameters as received from both their own (e.g. the host) vehicle and another vehicle during driving of the host vehicle. Parameters which are suitable for assessing e.g. energy efficiency may hereby be used, which may enable driving efficiency to be improved by providing a driver with information enabling the identification of parameters which may be changed to improve driving efficiency.

Thus, hereby is provided a method for improving driving efficiency, eliminating or at least reducing the problems and/or drawbacks associated with prior art solutions.

According to some embodiments a propulsion unit of the host vehicle is an electric motor and an energy storage unit of the host vehicle is a battery. Hereby parameters relating to energy efficiency, energy consumption and battery state of charge may be used.

According to some embodiments a propulsion unit of the host vehicle is an internal combustion engine and an energy storage unit of the host vehicle is fuel tank. Hereby parameters relating to fuel efficiency may be used for increasing the driving efficiency.

According to some embodiments the first set of parameters comprises at least one of the following parameters;
  host vehicle tyre pressure before the driving session,
  host vehicle axle pressure before the driving session,
  host vehicle weight and/or payload before the driving session,
  state of charge of a host vehicle battery before the driving session, and
  status of host vehicle electrical consumers before the driving session.

The driver and/or the (semi) autonomous driving system thus receives the input values on the first set of parameters before driving is initiated.

According to some embodiments the second set of parameters comprises at least one of the following parameters;
  host vehicle tyre pressure during the driving session,
  host vehicle axle pressure during the driving session,
  host vehicle weight and/or payload during the driving session,
  state of charge of a host vehicle battery during the driving session,
  status of host vehicle electrical consumption during the driving session
  host vehicle velocity/acceleration/deceleration profile during the driving session,
  accelerator pedal activation pattern during the driving session, brake pedal activation pattern during the driving session,
cruise control system activation level during the driving session,
idling pattern during the driving session,
revolution/min pattern for a host vehicle internal combustion engine during the driving session, and
host vehicle recuperation during the driving session.

All these parameters or factors may affect driving efficiency. Since the driver or (semi) autonomous drive system of the host vehicle may use information on these parameters relating to both the own host vehicle and a second host vehicle, i.e. another vehicle than the host vehicle, it is possible to improve driving efficiency by selecting the values for the second host vehicle if they lead to better driving efficiency than the current values for the host vehicle.

Embodiments herein also aim to provide system for improving driving efficiency for a host vehicle without the problems or drawbacks described above.

According to some embodiments, this is provided by a system for improving driving efficiency for a host vehicle with at least one propulsion unit and at least one energy storage unit, wherein the system comprises, sensors arranged to determine a first set of parameters which affects driving efficiency before a driving session with the first host vehicle are initiated and configured to provide input indicative thereof to a user interface or a host vehicle autonomous or semi-autonomous driving system, and arranged to monitor the first set of parameters and a second set of parameters which affects driving efficiency during the driving session of the first host vehicle, at least one processing unit, arranged to receive and compare parameters of the first and second set of parameters from the sensors with corresponding parameters received from at least one second host vehicle, and in response to identified differences between parameters of the first and second host vehicle, arranged to provide input indicative of the identified differences to the user interface or the autonomous or semi-autonomous driving system of the host vehicle.

Since parameters for the first and second set of parameters are compared with corresponding parameters received from at least one second host vehicle, input on the differences can be provided as input to an autonomous or semi-autonomous driving system of the host vehicle. If parameters from the second host vehicle lead to e.g. lower energy consumption, those can be used also for the host vehicle.

According to some embodiments the system comprises a user interface in form of a display. Hereby a status or value on a parameter relating to the host vehicle or a further vehicle in connection to the host vehicle may be displayed to an operator of the host vehicle.

According to some embodiments the system comprises an autonomous or semi-autonomous driving system which is arranged to store information on the compared parameters between the first host vehicle and the second host vehicle, and according to some embodiments it is arranged to select driving parameters for upcoming driving sessions for the host vehicle based on the stored set of parameters giving the best driving efficiency with regards to energy consumption. Hereby energy consumption, e.g. usage of electricity or fuel, can be reduced.

According to some embodiments the system is arranged receive and store information on compared parameters between the first host vehicle and a plurality of other host vehicles, and arranged to select driving parameters for upcoming driving sessions for the host vehicle based on the set of parameters giving the best driving efficiency with regards to energy consumption. Hereby data on parameters for an entire fleet of vehicles may be used for setting the parameters of the host vehicle optimally with regards to driving efficiency.

Embodiments herein also aim to provide system for improving driving efficiency for a host vehicle without the problems or drawbacks described above. According to some embodiments this is provided by a vehicle, wherein the vehicle comprises a system according to embodiments described herein.

Further features of, and advantages with, the embodiments herein will become apparent when studying the appended claims and the following detailed description. Those skilled in the art will realize that different features of the embodiments herein may be combined to create embodiments other than those described in the following, without departing from the scope of the appended claims.

BRIEF DESCRIPTION OF THE DRAWINGS

The various aspects of embodiments herein, including its particular features and advantages, will be readily understood from the following detailed description and the accompanying drawings, in which:

FIG. 2 illustrates a system and host vehicle according to some embodiments, FIG. 3 illustrates a plurality of vehicles comprising systems according to some embodiments.

DETAILED DESCRIPTION

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Like numbers refer to like elements throughout.

Well-known functions or constructions will not necessarily be described in detail for brevity and/or clarity.

Figure 1:
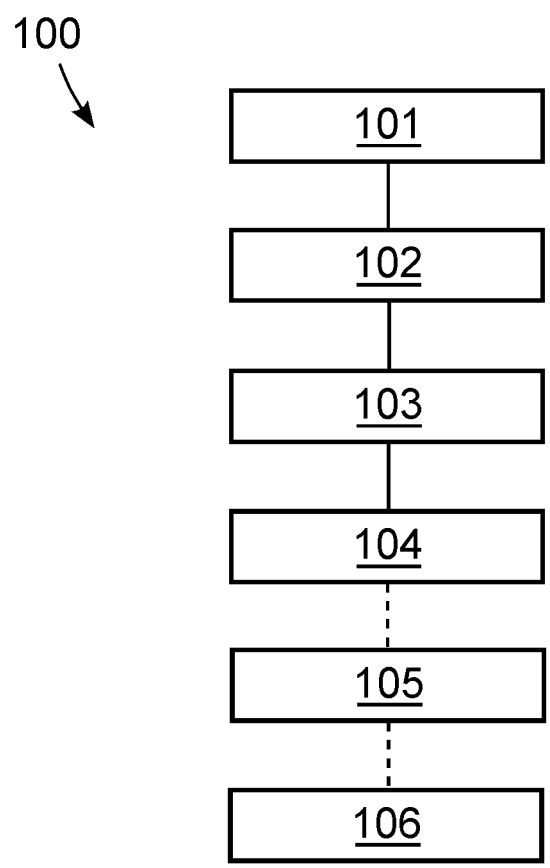
FIG. 1 illustrates a method for improving driving efficiency according to some embodiments.

FIG. 1 illustrates a method 100 for improving driving efficiency for a first host vehicle with at least one propulsion unit and at least one energy storage unit. The method 100 comprises:

Determining 101 a first set of parameters which affects driving efficiency before a driving session with the first host vehicle H1 is initiated. The first set of parameters may include and/or relate to any first host vehicle parameter which may affect driving efficiency/energy use and which is detectable or possible to determine during standstill, i.e. before a trip or journey is initiated. Information or input on some or all of these determined parameters are shown on a user interface associated with the first host vehicle and/or an autonomous or semi-autonomous driving system thereof.

The method 100 also comprises monitoring 102 a second set of parameters S2 which affects driving efficiency during the driving session of the first host vehicle H1. The second set of parameters may relate to any first host vehicle parameter which can affect driving efficiency/energy use and which is measurable or detectable during a driving session of the host vehicle.

The method 100 also comprises comparing 103 parameters of the first and second set S1, S2 of parameters with corresponding parameters received from at least one second host vehicle H2. In response to identified differences between parameters of the first H1 and second H2 host vehicle, the method may comprise providing 104 input indicative of the differences to the user interface and/or the autonomous or semi-autonomous driving system of the first host vehicle H1.

The method selectively also may comprise comparing 105 parameters of the first and second set S1, S2 of parameters with corresponding parameters received from one or a plurality of further host vehicles and providing 106 input indicative of the differences between the host vehicle and the one or plurality of further host vehicles to the user interface and/or the autonomous or semi-autonomous driving system of the first host vehicle H1. The input may also be provided to vehicle operators and/or driving systems of the further host vehicles.

FIG. 2 illustrates a schematically depicted first host vehicle H1. The host vehicle may be any type of vehicle, such as a passenger car, a truck, a long haul truck, a delivery truck, a hybrid electric truck, a fully electric truck or similar. In the embodiments described herein the vehicle is referred to as a host vehicle, indicating that it may host the systems and features described herein. In FIG. 3 three host vehicles H1, H2 and H3 are illustrated. They may communicate with each other (V2V) or with any type of infrastructure, roadside units, remote servers/the cloud C (V2X), as described below.

The first host vehicle H1 may be arranged for manual driving, for driving with some assistance systems, for semi-autonomous driving or for fully autonomous driving.

The first host vehicle H1 comprises a system 1 for improving driving efficiency for the first host vehicle H1. The first host vehicle H1 further comprises at least one propulsion unit P and at least one energy storage unit E. The propulsion unit P may be any type of mechanical and/or electrical system which may propel the host vehicle H1 during operation. It may be an electric motor, an internal combustion engine (ICE) driven on gas, diesel, LNG or any other type of fuel. The first host vehicle H1 may me a hybrid vehicle, which comprises two or more drive units, such as an electric motor in combination with an ICE.

The host vehicle 1 may comprise an autonomous or semi-autonomous driving system A. Such system A allows the first host vehicle H1 to be driven at least partly or fully autonomously. The driving system A may comprise an electrical/mechanical control arrangement, arranged to control steering and velocity of the host vehicle H1 at least partly based on information received from the sensors of the host vehicle. The driving system A is connected to a vehicle steering system, such that the driving system A, directly or indirectly, can control a direction of at least some of the wheels of the host vehicle H1. Hereby e.g. a yaw rate of the host vehicle can be adjusted, such that the driving direction of the host vehicle is adjusted in accordance with the input from the driving system A. The driving system A is also connected to one or more host vehicle engines/motors and a host vehicle braking system, such that the driving system A, directly or indirectly, can control acceleration and/or deceleration of the first host vehicle H1. The driving system A can e.g. increase a host vehicle velocity by increasing the motor/engine speed, and decrease the host vehicle velocity by motor-braking or by activation of one or more wheel brakes. The driving system A may e.g. be connected to an ABS (anti-lock braking system), such that one or more wheel brakes can be activated selectively.

The first host vehicle H1 may be equipped with various sensors and control arrangements which allow it to be driven autonomously. The sensors may for example be camera-sensors, radar-sensors and/or lidar-sensors. The sensors are arranged to continuously monitor the surroundings of the host vehicle in order to gather information on an upcoming road section. Such information may relate to a direction and/or gradient of the road section, road markings, traffic lanes, traffic signs, various climate and weather conditions etc. The sensors are generally also configured to detect positions, velocities and directions to surrounding vehicles on or near the road section.

The system 1 as described herein also comprises one or more sensors S arranged to determine a first set of parameters S1 which affects driving efficiency. The sensors S may determine the first set of parameters S1 (e.g. the values, state or the like of the first set of parameters) before a driving session with the first host vehicle H1 is initiated. The first set of parameters S1 may include host vehicle tyre pressure for some/all tyres of the host vehicle before the driving session, host vehicle axle pressure before the driving session, host vehicle weight and/or payload before the driving session, distribution of host vehicle weight and/or payload before the driving session (e.g. evenly distributed, with higher loading proximate the driver's cabin, with higher loading distal to the driver's cabin), state of charge of one or several host vehicle batteries before the driving session, temperature of the engine/motor, and/or status of host vehicle electrical consumers before the driving session.

For example, a pressure sensor may monitor tyre pressure, a temperature sensor may detect a current temperature of e.g. the cab interior, motor or engine, or the like. Weight-or pressure sensors may provide input on the weight and weight distribution of goods in a cargo compartment or trailer of the first host vehicle. Hereby also specific axle pressure can be determined. Electric sensors may be used to determine a current load from different electrical consumers (e.g. air conditioning, heat systems, lights, third party add-ons etc.) associated with the host vehicle, and may also detect or determine state of charge of a battery of the host vehicle.

The system 1 may send/provide input indicative of these parameters to a user interface 5 such that a vehicle operator is informed of a number of statuses/levels relating to these parameters. The system 1 may send/provide the input indicative of these parameters automatically upon a predetermined cue e.g. automatically upon starting of the motor or engine, upon a key being placed in the ignition, upon the driver door being opened, or the like). Alternatively the system 1 may send/provide the input upon request by a vehicle operator, for example as a result of interaction between the vehicle operator and the system (e.g. the user interface of the system) to request information on one or a number of statuses/levels relating the first set of parameters.

The system 1 may send/provide input indicative these parameters to the autonomous or semi-autonomous driving system A of the first host vehicle H1 such that it may serve as input before autonomous driving is initiated. The autonomous or semi-autonomous driving system A may then adapt an aspect of a driving style accordingly. For example an autonomous drive system may set a maximum allowed vehicle velocity if it is informed that a tyre pressure is less than recommended.

When a driving session with the host vehicle is initiated, the sensors S of the system 1 are further arranged to monitor a second set of parameters S2 which affects driving efficiency during the driving session of the first host vehicle H1. The second set of parameters S2 can be related to one or more of the following: Host vehicle tyre pressure for some all tyres during the driving session, detected by one or several tyre pressure sensors. Host vehicle axle pressure during the driving session, monitored by e.g. weight or pressure sensors. Host vehicle weight and/or payload during the driving session, monitored by e.g. weight or pressure sensors. State of charge of one or more host vehicle battery during the driving session and/or status of host vehicle electrical consumption during the driving session, monitored by electrical sensors.

The second set of parameters S2 can further be related to one or more of the following: Host vehicle velocity/acceleration/deceleration profile during the driving session, detected or monitored by velocity/acceleration/deceleration sensors and/or position sensors/GPS. Accelerator and/or brake pedal activation pattern during the driving session, monitored e.g. by position- or pressure sensors. Cruise control system activation level during the driving session, i.e. sensors/records on how much an automatic, semi-autonomous or autonomous driving system is activated/used during a driving session, and how much driving that is manually performed by the vehicle operator. Engine sensors may monitor an idling pattern, a revolution/min pattern for pistons of a host vehicle internal combustion engine and/or host vehicle recuperation/exhaust gas recirculation level during the driving session, or to measure the time in which the engine is stopped, for example because of use of a start/stop engine system configured to stop the engine from running during times when the host vehicle is stopped. The use of auxiliary systems such as cabin and/or windscreen heating and cooling systems, climate control systems, infotainment systems, or the like.

The system 1 also comprises at least one processing unit 2. In some embodiments the one or more processing units 2 are used for processing in several different vehicle systems. Some processing units 2 may be dedicated to a specific processing task. In some embodiments the first host vehicle H1 and/or the system 1 may comprise a large number of processing units 2. The one or more processing units 2 may be central processing units that carry out instructions of computer programs/software which when executed perform basic arithmetical, logical, and input/output operations. The system 1 may also comprise an accelerated processing unit, APU, also referred to as an advanced processing unit. An APU is a processing unit that includes additional processing capability designed to accelerate one or more types of computations outside of a CPU. One or more processing units 2 may comprise application programming interfaces, APIs, which specify how software components may interact with each other.

The first host vehicle H1 or the system 1 may comprise a communication unit 3 which is connected to the processing unit 2. The communication unit 3 may comprise a receiver that receives signals from at least one external source, such as other/surrounding vehicles H2, H3, . . . via V2X-communication (illustrated in FIG. 3), and converts them to information, such as real time information relating to any kind of detectable or estimated parameters. The receiver may also be configured to communicate with external sources in form of infrastructure such as remote servers, databases, clouds and/or roadside units via V2X-communication. The communication unit 3 may also comprise a transmitter which converts real time host vehicle information, e.g. relating to first- and/or second sets of parameters disclosed herein into a signal, such as an electrical signal and/or a signal carried by electromagnetic waves. Hereby information associated with the first host vehicle may be distributed to other vehicles and/or infrastructure such as remote servers, databases, clouds and/or roadside units.

Any suitable means may be used for the communication between the host vehicle and other vehicles or infrastructure, e.g. radio signals, such as according to either of standards, such as the GSM, 3G, LTE and/or WiFi standards, and/or satellite communication signals.

The system 1 may further comprise or be connected to a navigation system 4 to which a user can input a preferred host vehicle route. The navigation system 4 may comprise a positioning arrangement, which may determine a host vehicle position and heading. The positioning system may determine the host vehicle position and driving direction e.g. via a satellite based global positioning system or via map matching and a compass. Positions, headings and/or parameter data associated with a plurality of vehicles H1, H2, H3, . . . , may be displayed on a display connected to the navigation system.

The system 1 or the at least one processing unit 2 thereof is arranged to receive and compare parameters of the first S1 and second S2 set of parameters from the sensors S associated the first host vehicle H1 with corresponding parameters received from at least one second host vehicle H2. Parameter data may thus be sent from other vehicles H2, H3, . . . to the first host vehicle H1, which receives it and process/compares the received data with first host vehicle data from the sensors of the first host vehicle. Thus, the other vehicles H2, H3, . . . discussed herein may also comprise sensors, processing units, communication units and other necessary components for detecting and sharing the data.

The at least one processing unit 2 is also arranged to, in response to identified differences between determined parameters of the first host vehicle H1 and received parameters from the second host vehicle H2 and/or further vehicles, provide input indicative thereof to the user interface 5 and/or an autonomous or semi-autonomous driving system A of the first host vehicle H1.

The system 1 is also arranged to receive information from other vehicles relating to their energy consumption, i.e. fuel and/or electricity consumption, or changes in state of charge for batteries in other vehicles. The data on the energy consumption may be shared in real time or near-real time. It may concern energy consumption levels for e.g. a predetermined time duration, a pre-determined route or road section or similar. The system 1 is also arranged to send corresponding information on energy consumption for the first host vehicle to other vehicles, such that vehicle operator or driving systems thereof is enabled to use the information during decision making relating to parameter levels.

Thus, a vehicle operator or autonomous driving system of the first host vehicle H1 can be informed about a number of parameters for other vehicles, as well as the energy consumption for the other vehicles, and can adjust parameters for the host vehicle H1 based on this.

In some examples, the system 1 may comprise a memory, for example which may be in communication with the processing unit 4, or may be located in a unit such as the processing unit 4. The memory may be configurable to store at least one first set of parameters and/or at least one second set of parameters. The memory may be able to store information on a route or routes taken by the host vehicle between a start point and a destination. The memory may be able to provide information to the user interface 5 that relates to a first and/or second set of parameters, and an associated start point and destination and/or route. A vehicle operator may be able to compare a present parameter or set of parameters (e.g. a first set of parameters, or a second set of parameters) to those stored in the memory, and therefore a previous journey. The vehicle operator may be able to compare the parameters of a past identical or similar journey with those of a present journey. This may assist a user to improve their standard and/or efficiency of driving by providing an opportunity to achieve more favourable parameter values or statuses based on a past journey.

Figure 4:
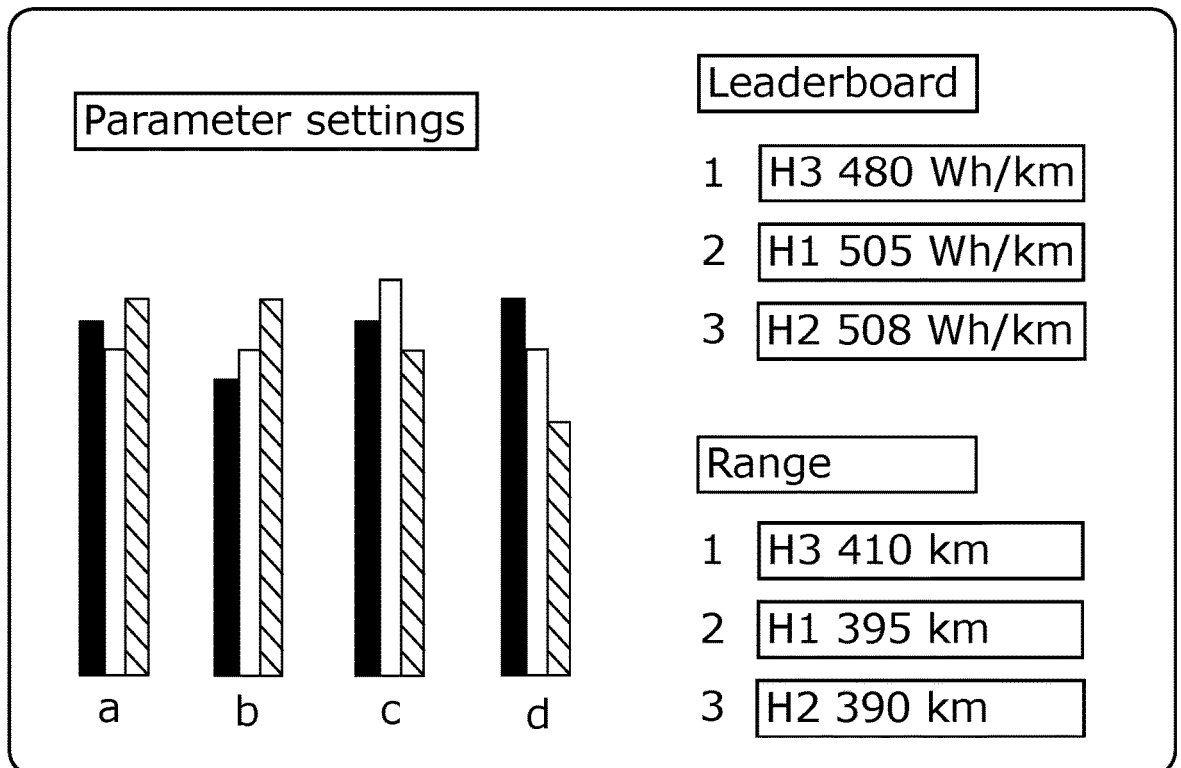
FIG. 4 illustrates a user interface according to some embodiments.
Figure 5:
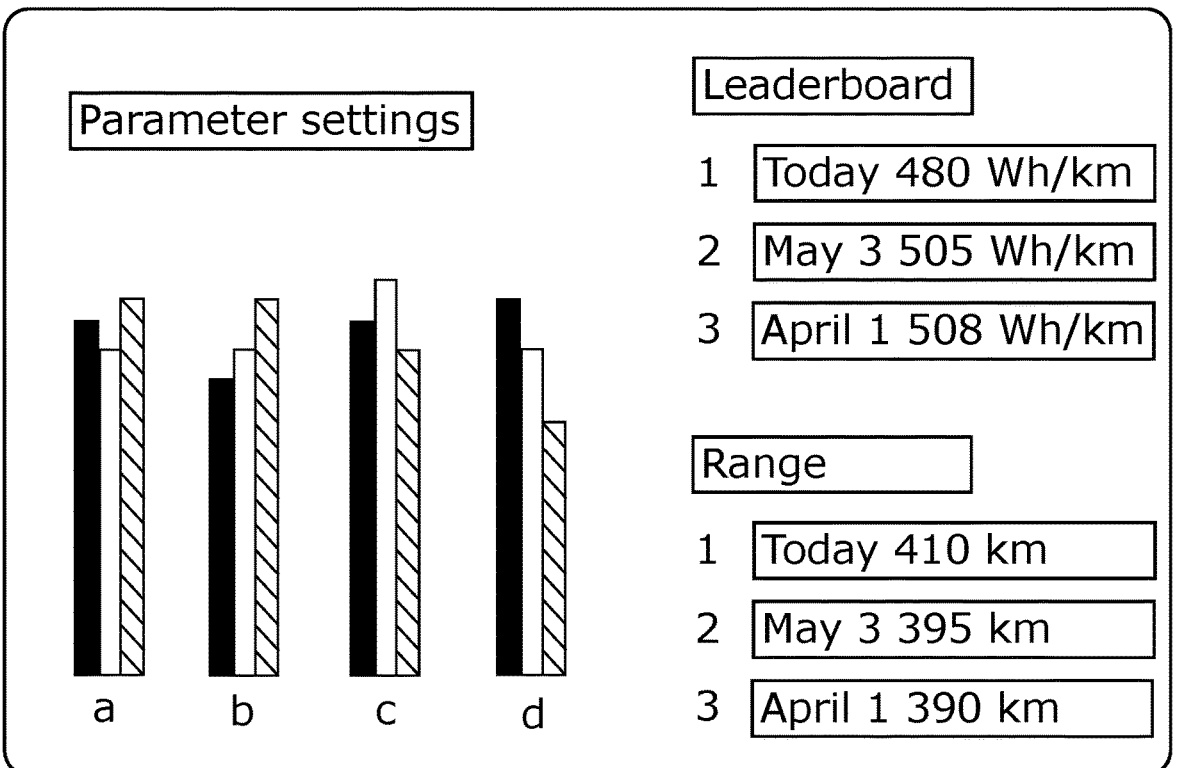
FIG. 5 illustrates a user interface according to some further embodiments.

In FIGS. 4 and 5 display configurations are illustrated which shows examples on how the methods and system herein may be carried out or implemented.

Example 1, shown in FIG. 4: A first vehicle operator is about to drive a first host vehicle with goods a route between two locations (e.g. a start point and a destination). Before the trip is started he/she is informed on some parameters of the of first host vehicle, such as tyre pressure and cabin temperature.

A second and a third vehicle operator is about to drive a second and a third host vehicle respectively. The second and third host vehicles have approximately the same amount/weight of goods as the first host vehicle, and should drive the same route. Before the trip is started the vehicle operators are shown a first set of parameters on displays of the host vehicles, or on displays of tablets, mobile phones or similar associated with themselves or the host vehicle which they are driving. The first set S1 of parameters for the host vehicles can indicate e.g. tyre pressure, axle pressure and cabin temperature. For example, tyre pressure for the first host vehicle H1 may be illustrated with a black bar over parameter "a" in the diagram to the left in FIG. 4. Tyre pressure for the second host vehicle H2 may be illustrated with a white bar over parameter "a" in the diagram. Tyre pressure for the third host vehicle H3 may be illustrated with a striped bar over parameter "a" in the diagram. For parameter "b" in the diagram axle pressure for the different vehicles are shown in a similar manner.

The second set S2 of parameters for the host vehicles may include values relating to how much a particular host vehicle is accelerated/braked, or how much an autonomous drive system is used. For example, amount of acceleration/deceleration for the first host vehicle H1 may be illustrated with a black bar over parameter "c" in the diagram. Amount of acceleration/deceleration for the second host vehicle H2 may be illustrated with a white bar over parameter "c" in the diagram. Amount of acceleration/deceleration for the third host vehicle H3 may be illustrated with a striped bar over parameter "c" in the diagram. For parameter "d" in the diagram e.g. recuperation level during drive for the different vehicles are shown in a similar manner.

Accordingly, a plurality of parameters are shown to the drivers. In some embodiments only parameter values from the first set S1 are shown. In some embodiments only parameter values from the second set S2 are shown. In some embodiments selected parameter values from both the first set S1 and the second set S2 are shown.

On the upper right part of the display a "leader board feature" is illustrated. Here energy consumption, such as Watt-hours per driven kilometre or amount of used fuel/diesel per driven kilometre is shown. In the example of FIG. 4, the third host vehicle H3 is leading, i.e. it uses the least amount of energy per kilometre (or time unit). The vehicle operators in the first host vehicle H1 and second host vehicle H2 can see the which parameters that are used in the third host vehicle H3 (e.g. which tyre pressures that wheels of the third host vehicle H3 have or how much aiding systems such as cruise control/(semi) autonomous drive systems are used). He/she may then use the same values for her/his respective host vehicle in order to reduce energy consumption.

In a corresponding manner input variables on an (semi) autonomous driving system in the third host vehicle H3 may be provided/communicated to the (semi) autonomous driving system in the first and second host vehicles in order to reduce energy consumption. Such process may be automatic, or a "copy parameters from leader vehicle"—function of the system 1 which may be activated or enabled by the vehicle operator.

The vehicle operators may thus compete with each other o driving as efficient as possible, and they may learn best practice from each other. Hereby great energy savings and more efficient driving for entire vehicle fleets are achieved. Fleet owners may set up competitions with awards or prizes for the best drivers, or may set up competitions with other fleet owners.

The input relating to parameter values may also be assessed/processed by artificial intelligence/machine learning, such that the optimal parameters for a host vehicle may be set based on data from a large amounts of routes and/or a large amount of vehicles.

FIG. 5 illustrates a variant of the set-up in FIG. 4, but here a vehicle operator may compete with him/herself. Parameter values for a current trip are compared with parameter values associated with earlier trips. Hereby he/she may compete with him/herself. In a corresponding manner input variables for a (semi) autonomous driving system may be compared with historic input variables. As illustrated in right part of FIG. 5, the vehicle operator may see ranges and energy consumption for the current trip as well as for earlier trips.

Although the aspects has been described with reference to example embodiments, many different alterations, modifications and the like will become apparent for those skilled in the art. Therefore, it is to be understood that the foregoing is illustrative of various example embodiments and the scope of the appended claims is not to be limited to the specific embodiments disclosed and that modifications to the disclosed embodiments, combinations of features of disclosed embodiments as well as other embodiments are intended to be included within the scope of the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A method for improving driving efficiency for a first host vehicle with at least one propulsion unit and at least one energy storage unit, wherein the method comprises:

determining a first set of parameters regarding the first host vehicle which affects driving efficiency before a driving session with the first host vehicle is initiated and providing input indicative of the first set of parameters to a user interface or an autonomous or semi-autonomous driving system of the first host vehicle;

monitoring a second set of parameters which affects driving efficiency during the driving session of the first host vehicle;

comparing parameters of the first and second set of parameters with corresponding parameters received from at least one second host vehicle, and in response to identified differences between parameters of the first and second host vehicle; and providing input indicative thereof to the user interface or the autonomous or semi-autonomous driving system of the first host vehicle.

2. The method according to claim 1, wherein a propulsion unit of the first host vehicle is an electric motor and an energy storage unit of the first host vehicle is a battery.

3. The method according to claim 1, wherein a propulsion unit of the first host vehicle is an internal combustion engine and an energy storage unit of the first host vehicle is fuel tank.

4. The method according to claim 1, wherein the first set of parameters is related to at least one of:
host vehicle tyre pressure before the driving session,
host vehicle axle pressure before the driving session,
host vehicle weight and/or payload before the driving session,
state of charge of a host vehicle battery before the driving session, and
status of host vehicle electrical consumption before the driving session.

5. The method according to claim 1, wherein the second set of parameters is related to at least one of:
host vehicle tyre pressure during the driving session,
host vehicle axle pressure during the driving session,
host vehicle weight and/or payload during the driving session,
state of charge of a host vehicle battery during the driving session,
status of host vehicle electrical consumption during the driving session,
host vehicle velocity/acceleration/deceleration profile during the driving session,
accelerator pedal activation pattern during the driving session,
brake pedal activation pattern during the driving session,
cruise control system activation level during the driving session,
idling pattern during the driving session,
revolution/min pattern for a host vehicle internal combustion engine during the driving session, and
host vehicle recuperation during the driving session.

6. A system for improving driving efficiency for a first host vehicle with at least one propulsion unit and at least one energy storage unit, wherein the system comprises:
sensors arranged to determine a first set of parameters regarding the first host vehicle which affects driving efficiency before a driving session with the first host vehicle is initiated and arranged to provide input indicative thereof to a user interface or an autonomous or semi-autonomous driving system of the first host vehicle, and arranged to monitor a second set of parameters which affects driving efficiency during the driving session of the first host vehicle; and
at least one processing unit, arranged to receive and compare parameters of the first and second set of parameters from the sensors with corresponding parameters received from at least one second host vehicle, and in response to identified differences between parameters of the first and second host vehicle, arranged to provide input indicative thereof to the user interface or an autonomous or semi-autonomous driving system of the first host vehicle.

7. A system according to claim 6, comprising a user interface in a form of a display.

8. A system according to claim 6, comprising an autonomous or semi-autonomous driving system which is arranged to store information on the compared parameters between the first host vehicle and the second host vehicle.

9. A system according to claim 8 wherein it is arranged to select driving parameters for upcoming driving sessions for the first host vehicle based on a stored set of parameters giving the best driving efficiency with regards to energy consumption.

10. A system according to claim 9 wherein it is arranged to receive and store information on compared parameters between the first host vehicle and a plurality of other host vehicles and arranged to select driving parameters for upcoming driving sessions for the first host vehicle based on the set of parameters giving the best driving efficiency with regards to energy consumption.

11. A first host vehicle, wherein the first host vehicle comprises a system according to claim 6.

\* \* \* \* \*